United States Patent [19]
Knox et al.

[11] Patent Number: 5,631,758
[45] Date of Patent: May 20, 1997

[54] CHIRPED-PULSE MULTIPLE WAVELENGTH TELECOMMUNICATIONS SYSTEM

[75] Inventors: Wayne H. Knox, Rumson; Martin C. Nuss, Fair Haven, both of N.J.

[73] Assignee: Lucent Technologies Inc., Murray Hill, N.J.

[21] Appl. No.: 548,537

[22] Filed: Oct. 26, 1995

[51] Int. Cl.$^6$ ...................................................... H04J 14/02
[52] U.S. Cl. ........................ 359/127; 359/124; 359/181; 372/18
[58] Field of Search ............................. 359/115, 123, 359/124, 126, 127, 173, 181, 186; 372/18, 20, 28

[56] References Cited

U.S. PATENT DOCUMENTS 4,300,161  11/1981  Haskell .................................. 370/109
4,928,316  5/1990  Heritage et al. ...................... 359/186
5,105,294  4/1992  Degura et al. ........................ 359/154
5,450,427  9/1995  Fermann et al. ..................... 372/18
5,477,375  12/1995  Korotky et al. ...................... 359/183

*Primary Examiner*—Wellington Chin
*Assistant Examiner*—Rafael Bacares
*Attorney, Agent, or Firm*—John A. Caccuro

[57] ABSTRACT

An apparatus and method provides optical multiple wavelength signals using a single optical broadband source to generate many independent optical wavelength channels. An optical transmitter includes a pulse chirping device which separates the frequency components of periodic optical pulses in the time domain forming separate wavelength channels which are separately modulated by a high-speed broadband optical modulator. A receiver includes a passive splitter to separate the individual wavelength channels. The chirped-pulse transmitter can then be conveniently adjusted to provide optimum overlap of wavelength channels with the modulating channel spectra.

29 Claims, 12 Drawing Sheets

INPUT → ← MULTIPLE WAVELENGTH OUTPUTS

← HIGHER ORDER GRATING MODES | DESIRED CHANNELS | HIGHER ORDER GRATING MODES →

TRANSMISSION vs WAVELENGHT

← BLANKING CHANNELS | DESIRED CHANNELS | BLANKING CHANNELS →

INTENSITY vs WAVELENGHT

LASER SPECTRUM

602 | 601 | 603

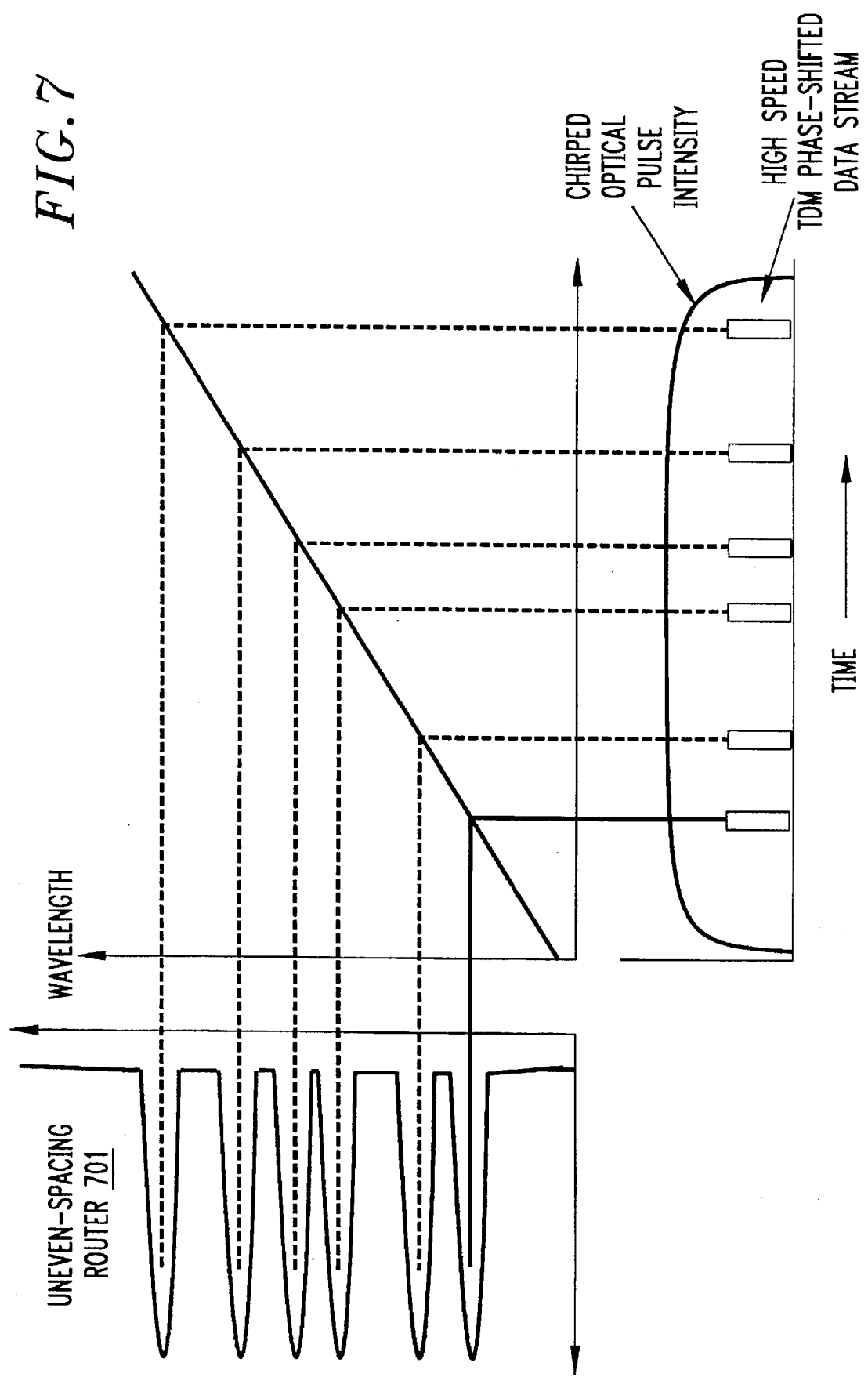

LOOPBACK ARCHITECTURE FOR RING NETWORK USING
BROADBAND CHIRPED-PULSE WDM TRANSMITTER

ANALOG TIME-DOMAIN CHANNEL EQUALIZATION SCHEME
FOR SHIRPED-PULSE WDM TRANSMITTER

CHIRPED-PULSE MULTIPLE WAVELENGTH TELECOMMUNICATIONS SYSTEM

TECHNICAL FIELD OF THE INVENTION

The present invention relates generally to the improvements in optical communications systems. More particularly, the present invention relates to a chirped-pulse multiple wavelength communications system.

BACKGROUND OF THE INVENTION

The transmission capacity of optical communications systems is presently limited by the optical source modulation bandwidth and dispersive and nonlinear propagation effects. Although the optical fiber has a very broad optical bandwidth (10–20 THz), the system data rates transmitted over fibers are presently limited to about 2.5 Gbits/sec for single-channel communications systems using typical single-channel communications approaches with conventional sources such as wavelength-tuned distributed-feedback (DFB) lasers. Wavelength division multiplexing (WDM) generally increases optical system capacity by simultaneously transmitting data on several optical carrier signals at different wavelengths. The total system capacity is increased by a factor equal to the number of different wavelength channels. Other advantages of WDM are in point-to-multipoint communications systems such as in fiber-to-the-home. In this case, improved power splitting budget, security, upgradability, service flexibility and lower component speed requirements compared to time-division-multiplex (TDM) point-to-point links make WDM attractive.

As used herein, the term "WDM" system will refer generally to a system capable of transmitting data on several wavelength channels. Other systems may use a number of individual optical modulated sources tuned to different wavelengths, and then combined and transmitted together.

Prior art WDM systems which transmit data on many channels, therefore generally include a separate optical modulation source for each channel. For example, an array of laser diodes may be used with each laser diode tuned to a different frequency and individually modulated. The laser frequencies are generally evenly spaced, combined using an optical coupler and then transmitted through an optical fiber. At the other end of the fiber, a device is used to separate the wavelength channels, and a separate optical receiver is generally used for each of the wavelength channels.

Despite the substantially higher bandwidth in fiber-based communications schemes that could be obtained with a WDM approach, present WDM suffer from a number of difficult technical problems, and at present WDM systems are not commercially viable for mass market applications such as fiber distribution to the home. For example, WDM systems would be most cost-effective for a large number of channels (32–64 or even 128), however present multichannel laser diodes are very difficult to fabricate with acceptable yield even with a few as 8 channels. In addition, passive WDM splitters currently available have a large temperature variation of their passband channels, thereby requiring continuous tunability in the multichannel sources which is not yet available. Packaging and complexity/yield problems with current WDM systems approaches thus represent a significant problem in present WDM systems. These complexity and yield problems significantly increase the cost of the WDM implementation.

Therefore, although WDM offers an elegant solution to increasing the capacity and transparency of optical networks, WDM for fiber distribution networks as currently envisioned is not cost-competitive with simple point-to-point schemes (one fiber per customer), and more cost-effective schemes are needed. For fiber-to-the home optical communications systems, low-cost methods of delivering optical signals into and out from the home is a challenging problem. Although time-domain multiplexing (TDM) of data streams would be another method of increasing transmission capacity, it is not desirable to build a specific network with expensive high frequency electronic components that are difficult to upgrade in the future. For example, in order to deliver 50 Mbits/sec data rates into a single house, a 32 channel system would require transmitters, routers, amplifiers, receivers and modulators with 1.5 Gbits/sec capacity and above. It is not desirable to place such expensive and state-of-the-art components into every home. In addition, it is desirable to have as much of the system in the field and in the home transparent and passive, i.e. line-rate independent and not requiring any electrical powering. In addition to the low data rate systems as required for local access (50–155 MHz), high data rate systems (622 MHz-2.5 Gbits/sec) can also benefit from WDM. In such a case, similar problems are caused by the difficulty in obtaining a multifrequency source with adequate channel tuning, stability and modulation bandwidth.

As is apparent from the above, there is a continuing need for an efficient and cost-effective WDM system that is capable of transmitting a large number of spectral channels.

SUMMARY OF THE INVENTION

This invention describes the use of a single high-speed single-channel modulator to separately modulate each of the wavelengths of chirped optical pulses for use in wavelength multiplexed communication systems, thereby eliminating the problem of making large arrays of modulators where one modulator is used for each wavelength.

More particularly, the present invention provides an optical wavelength apparatus including an optical disperser for receiving short optical pulses at a first rate and forming therefrom a train of chirped optical pulses with each such chirped optical pulse extending over a plurality of time periods, each time period associated with a different optical wavelength channel. An optical modulator encodes the optical wavelength channel of one or more of the time periods of selected ones of the chirped optical pulse train using a data signal operating at a second rate, equal to or greater than said first rate, to form an encoded optical signal. In one embodiment, the optical modulator is also responsive to an input analog signal having a predefined (e.g., sinusoidal) amplitude or phase characteristic which is modulated by the optical modulator to produce a substantially amplitude- or phase-equalized encoded optical signal.

An optical multiple wavelength communication system is formed by using the multiple wavelength apparatus together with a multiple wavelength receiver for demultiplexing the received encoded optical signal into the plurality of modulated optical wavelength channels.

Another embodiment provides a duplex optical communication system where alternate chirped optical pulses are selected for encoding at the transmitter location and sent along with the unencoded chirped optical pulses to the receiver location where they are encoded and then sent back to the transmitter location. Alternatively, the plurality of time periods of the chirped optical pulses sent to the receiver may be divided into at least two portions, one portion having at least one optical wavelength channel encoded at the transmitter location and another portion having unencoded optical wavelength channels that are then encoded at the receiver location and sent back to the transmitter location.

BRIEF DESCRIPTION OF THE DRAWING

In the drawing,

FIG. 7 is a diagram showing how WDM splitter devices that have unequal channel spacing can be used in accordance with the present invention by time-shifting the individual data bits;

DETAILED DESCRIPTION

In the following description, each item or block of each figure has a reference designation associated therewith, the first number of which refers to the figure in which that item is first located (e.g., 101 is located in FIG. 1).

Figure 1A:
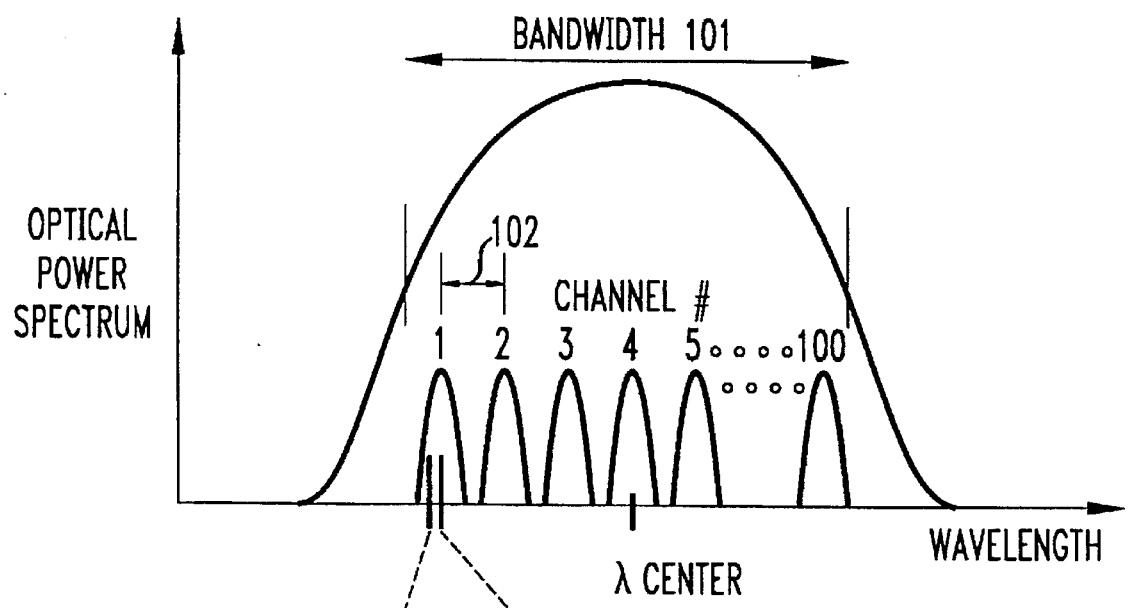
FIG. 1(a) is an exemplary frequency spectrum of a modelocked laser pulse.

The present invention provides a single-source optical multiple wavelength transmission and receiving system suitable for use in a wide variety of applications. The present invention eliminates the need for multiple light sources in broadband WDM systems, uses only a single broadband optical modulator, and provides for an simple and efficient channel tuning alignment with the WDM router component that separates the data streams in the field. FIG. 1(a) shows an exemplary short optical pulse spectrum. A short pulse optical signal contains a large optical bandwidth 101, as required by the uncertainty relation. In a preferred embodiment, a 50–100 fs pulse from a modelocked laser source (e.g., 201 of FIG. 2) at a repetition rate fixed by the downstream data rate is used as the signal source. The repetition rate of the laser is determined by the downstream data rate appropriate for the application. For local access application, the rate may, illustratively, be 50 MHz.

Figure 1B:
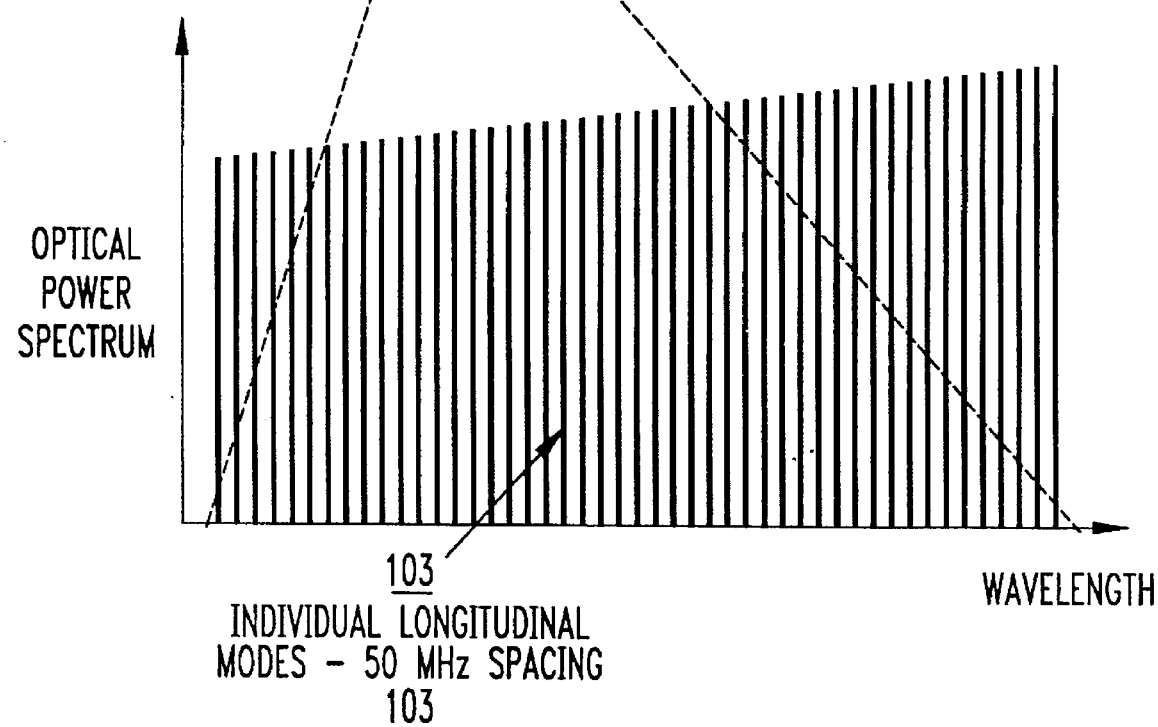
FIG. 1(b) is a more detailed view of an exemplary portion of the modelocked pulse frequency spectrum in FIG. 1(a), illustrating a plurality of longitudinal cavity modes that comprise a single WDM channel.

Such a pulse has about 5 THz ($5 \times 10^{12}$ Hz) bandwidth 101, which is sufficient to support as many as 50 data channels at a 100 GHz channel spacing 102. FIG. 1(b) shows a magnified view of the pulse spectrum of one channel of FIG. 1(a). The longitudinal mode spacing 103 is equal to the repetition rate of 50 MHz in the exemplary embodiment. Typically, WDM channel spacings are expected to be in the range of 100–200 GHz; therefore each WDM channel contains several thousand longitudinal modes. As such, the modelocked laser acts as a 'continuum' optical source which fills each WDM channel with many longitudinal modes, and the individual modes do not have to be 'locked' to the WDM channel frequencies. This is a highly desirable characteristic for a WDM transmitter. We note that WDM channels are specified to have equal frequency spacing, such as 100 or 200 GHz. Since wavelength and frequency have an inverse relation, the wavelengths of the respective channels are not precisely equal. Over a 50 nm bandwidth, the error in assuming equal wavelength spacings is small; therefore we use either term where convenient.

Figure 2:
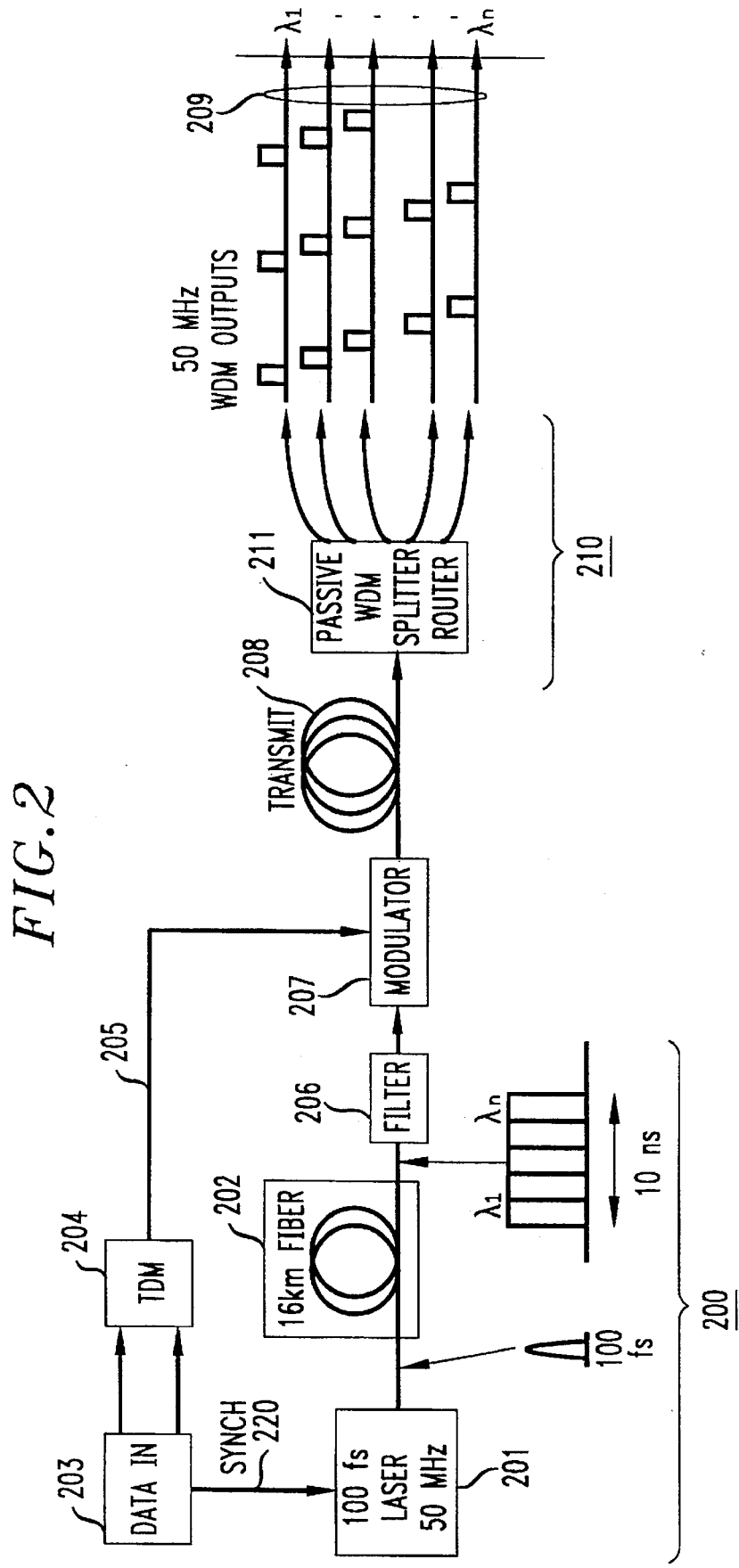
FIG. 2 is a block diagram of an exemplary optical chirped-pulse wavelength-division-multiplexing transmission system in accordance with the present invention.

FIG. 2 shows an exemplary block diagram of a chirped-pulse WDM system including a transmitter 200 and a receiver 210. A short optical pulse, from laser 201, is linearly chirped by passing it through a disperser 202, e.g., a standard telecom fiber such as a single-node optical fiber, of a carefully chosen dispersion parameter D and length in the range of about 1–20 km. The linearly chirped pulse comes out with a pulsewidth of 1–20 ns, depending on the initial source bandwidth and the dispersion-length product of the stretching fiber. For example, the dispersion parameter D is 17 ps/nm-km for AT&T 5D telecommunications fiber. This chirped pulse can be thought of a consisting of a series of pulses each with a successively increasing (or decreasing depending on the dispersion sign) wavelength. Optionally, a frequency-dependent filter 206 (such as a cladding-dumping fiber grating or a multilayer interference filter) may be connected to the output of disperser 202 to equalize the power spectra of some or all of the optical wavelength channels.

In one embodiment, a data source 203 generates multiple low-frequency data signals (typically 32 channels at 50

Mbits/sec) that are time-division-multiplexed (TDM) up to a high data rate (1.6 Gbits/sec) 205 by an electronic TDM unit 204.

Figure 3A:
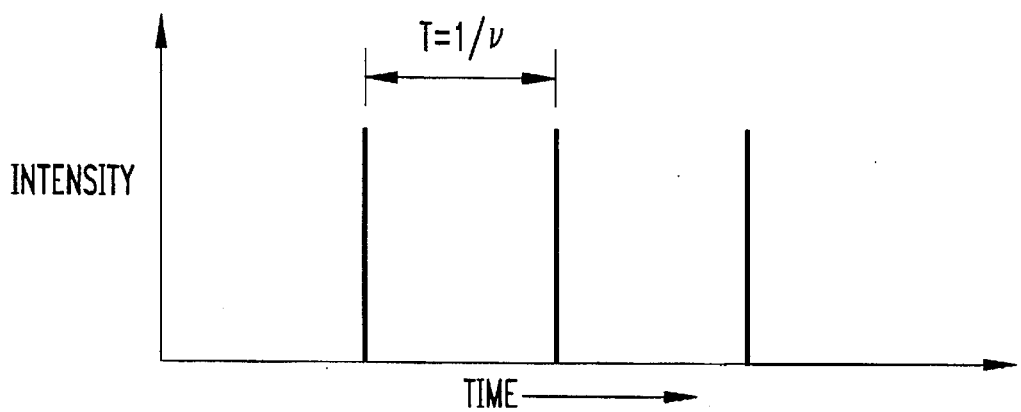
FIG. 3(a) is a diagram showing the input train of short optical pulses.
Figure 3B:
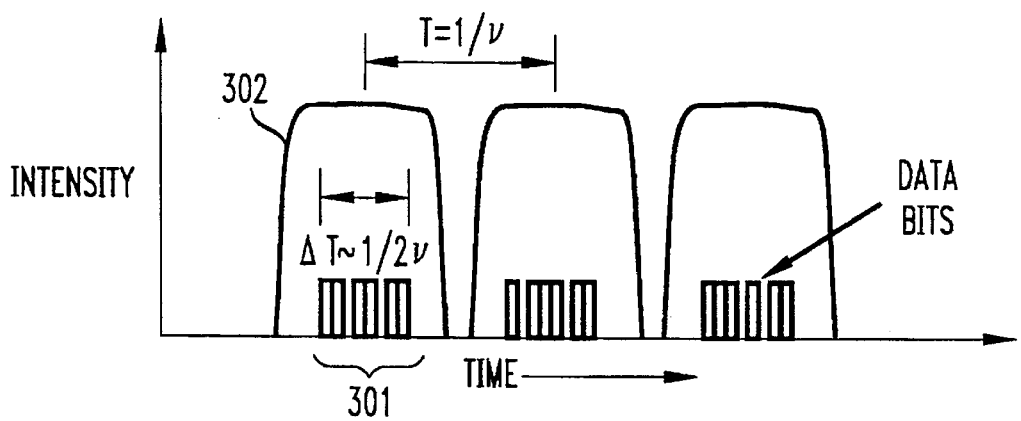
FIG. 3(b) is a diagram showing how the short optical pulse train is stretched and re-shaped after passing through the linear chirping filter, and the manner in which individual data bits are TDM encoded onto the chirped pulses.

FIG. 3(a) shows a train of short optical pulses (at a repetition rate T=1/$\gamma$=20 ns), and FIG. 3(b) shows how the individual short optical pulses are stretched by the action of the linear chirping disperser 202. FIG. 3(b) also, illustratively, shows that only half, 301, of all the wavelength channels generated after being passed through a linear chirping filter (i.e., the fiber of disperser 202) are utilized (i.e., $\Delta T \approx 1/2\gamma$). The waveform 302 represents the combined frequency response of elements 201, 202 and 206. Because of the filter characteristics, only a fraction (½) of the wavelength channels available are utilized. This provides more uniformity in the amplitude of the wavelength channels utilized and also provides a guard band between adjacent groups of wavelength channels.

The data pattern shown in 301 results after the wavelength channels of the chirped pulse optical signal are encoded by modulator 207 using the high data rate signal 205. The high data rate signal 205 must have a data rate which is equal to the rate ($\gamma$) of the chirped pulse rate multiplied by twice the number of wavelength channels 301 utilized. As shown in FIG. 3(b), 301 contains 8 wavelength channels. Obviously, if all of the 16 wavelength channels could be utilized (with an ideal filter characteristic 302) the data rate would be 16 times the chirped pulse rate. Moreover, if only one wavelength channel was utilized each period T, then the data rate would be equal to the chirped pulse rate.

As noted, the high data rate signal 205 is encoded onto the chirped pulse optical signal by passing it through a broadband optical modulator 207. This modulator 207 is capable of modulating optical signals over a wide wavelength range (50 nm bandwidth, typically) and has low polarization dependence. A bulk InGaAsP waveguide modulator is the preferred modulator 207 for this embodiment; however, any broadband optical modulator could be used. The frequency of the modelocked laser 201 is set to equal the desired data rate, and phase-locked to an integer submultiple of the data source 203. After passing through the modulator 207, the chirped pulse is actually a series of modulated data pulses 301, each at a different wavelength. Each different wavelength (referred to herein as a channel) is modulated with the information to be transmitted on that particular channel. The transmitter 200 of the present invention provides a method of transmitting data on many separate wavelength channels, using only a single broadband multifrequency source, of which a modelocked laser is the preferred embodiment.

The output of modulator 207 is transmitted over an optical medium 208 (e.g., optical fiber) to a multiple wavelength receiver 210 (e.g., a passive WDM splitter router) which demultiplexes the received optical signal into a plurality of modulated optical wavelength channels 209 (e.g., 50 MHz WDM channels).

The transmission system of FIG. 2 is extremely versatile since the initial optical source 201 has no fixed 'channels'— rather, it is an optical continuum. The maximum number of transmitted channels is determined by the source bandwidth and the WDM channel spacing. The following relations can be used to design a chirped-pulse WDM transmitter 210:$\tau$= D·L·$\Delta\lambda$ and $\tau$=1/N·$v_D$, where $\tau$ is the time slot per bit, D is the dispersion parameter of the fiber, L is the chirping fiber length, $\Delta\lambda$ is the channel spacing, N is the number of channels and $v_D$ is the downstream data rate (50 MHz in our example). The chirped-pulse WDM transmitter 200 is a versatile concept that can be utilized with a variety of data types (e.g., analog or digital) and modulation types (amplitude, solitons, pulsewidth, etc.) which operate at a variety of data rates, and for a variety of numbers of channels. Additionally, while the transmitter 200 has been described as utilizing a single-mode dispersive optical fiber as the optical disperser 202, it should be understood that an optical prism or optical grating could also be utilized. Illustratively, the optical grating function may be provided by a series of optical gratings as shown in FIG. 13, as described in a later paragraph.

While the receiver 210 has been described as utilizing a passive WDM splitter or router, it should be understood that a waveguide grating router, diffraction grating, interference filter array, or other apparatus for demultiplexing the received optical signal into the plurality of modulated optical wavelength channels may be utilized.

According to our invention, if a WDM splitter in the receiver 210 is upgraded or changed (causing changes in wavelength channels), the TDM source at transmitter 200 can easily be changed to accommodate the new wavelength channel. Our approach is attractive since all the high-speed TDM electronics is at the transmitter 200 which can be located at a central office, and the simple passive WDM 211 (at receiver 210) is located, literally, in the field where it is less accessible and where more hostile environmental conditions exist.

Figure 4A:
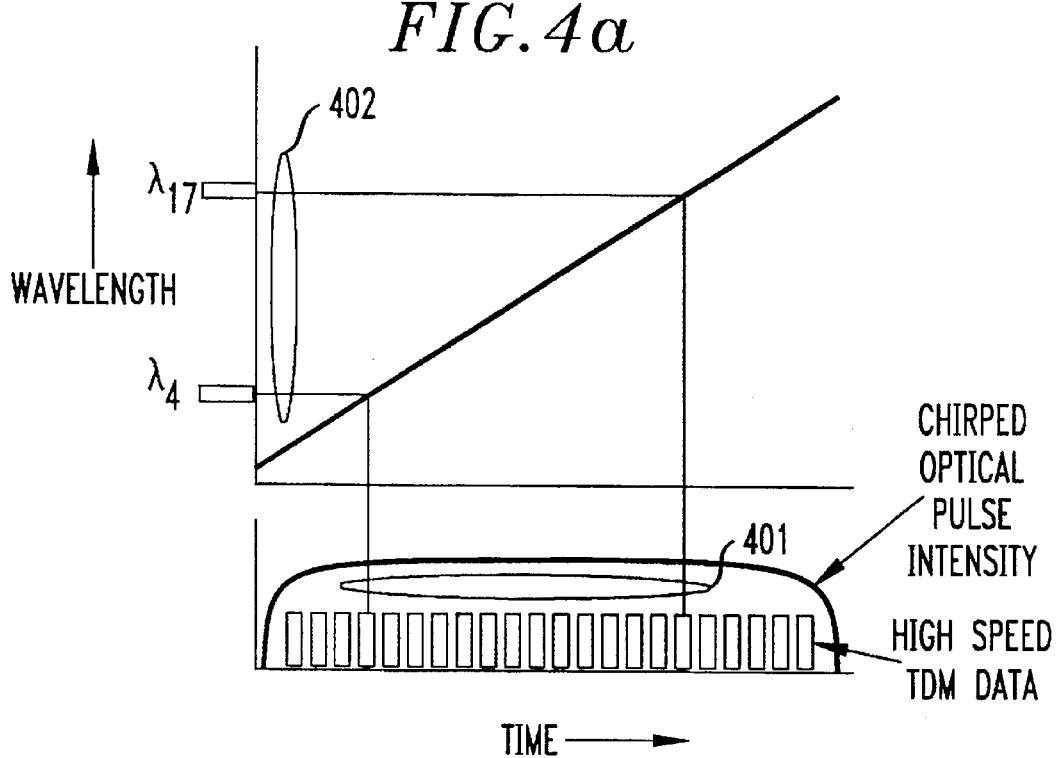
FIG. 4(a) is an illustration of the time-dependent frequency of the optical pulse, with the individual TDM bit positions noted.
Figure 4B:
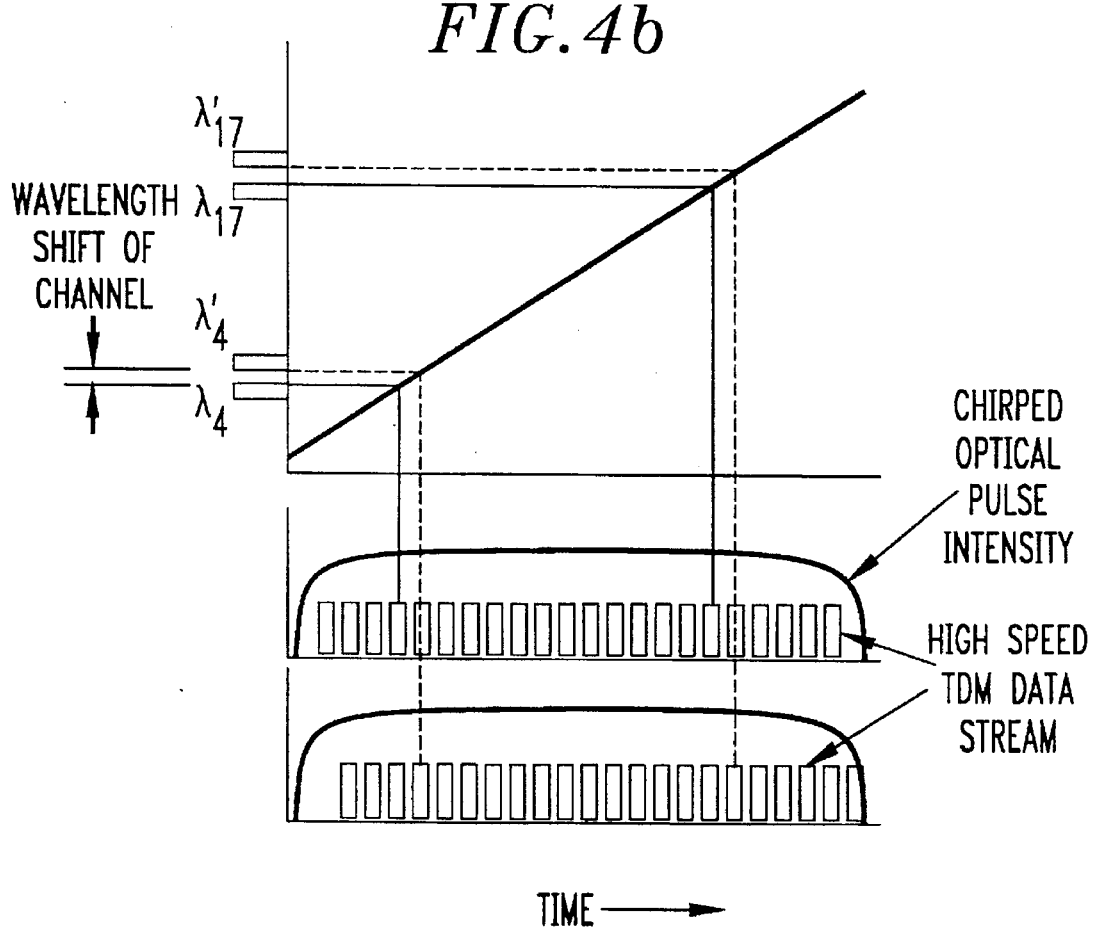
FIG. 4(b) is an illustration of the time-dependent frequency of the optical pulse, with the individual TDM bit positions noted.

FIG. 4(a) shows a time-frequency plot of the chirped optical pulse. The high speed data stream to be encoded on the chirped pulse is also shown. As shown in this figure, each TDM encoded bit 401 is transmitted at a different adjacent wavelength 402. In order to properly separate the data bits at the downstream end, it is necessary for the time delays to be set properly, since the time delay relative to the chirped pulse envelope determines the frequency of each channel. In actual WDM devices (at receiver 210), a significant shift of the wavelength channels is caused by temperature fluctuations. If the transmitter 200 cannot 'tune' or shift the wavelengths of the data channels to match the new comb of wavelengths in the WDM device, the channels will fall out of alignment, and the data will be lost or transmitted to the wrong locations. An important feature of the present invention is the ability of the transmitter 200 to shift all the wavelengths 402 together to align the wavelength comb correctly with the WDM transmission channels 401, for any temperature, by simply phase-shifting the TDM data stream, as shown in FIG. 4(b). In the first case shown, data bit #4 ($\lambda_4$) is transmitted at a certain wavelength. In the lower portion of the figure, data bit #4 has been phase-shifted later by introducing a small time delay and, as a result, data bit #4 is transmitted at a slightly different wavelength. At the same time, data bit #17 ($\lambda_{17}$) is shifted by the same wavelength offset. Therefore, the entire wavelength comb can be simultaneously shifted by adjusting a single parameter: the synchronization 220 between the TDM data stream and the chirped optical source clock.

Figure 5:
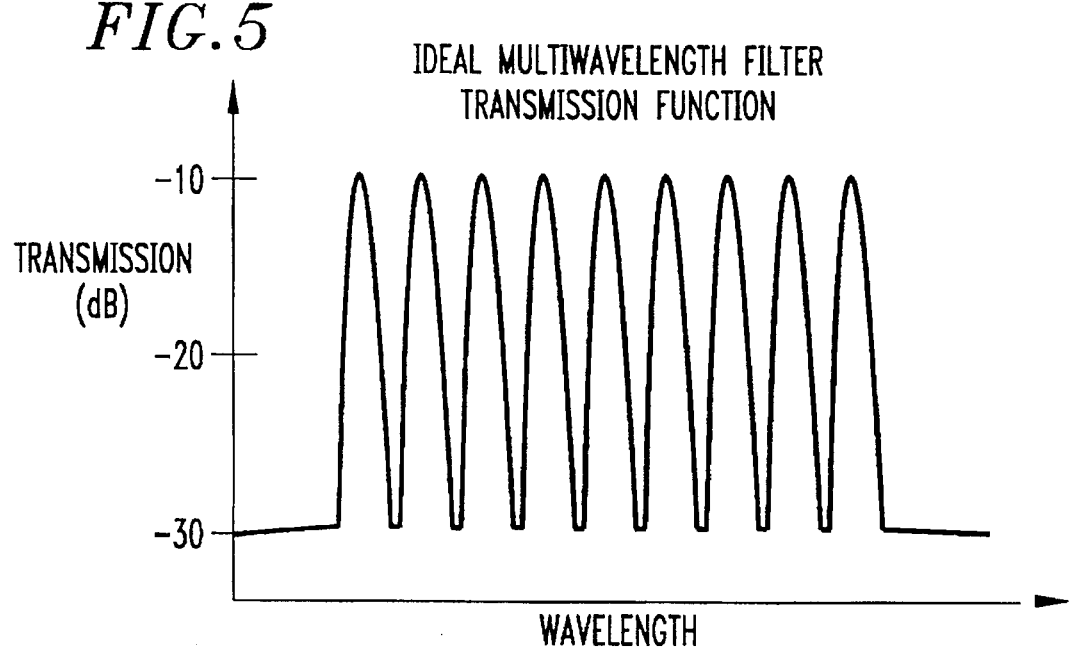
FIG. 5 is a diagram showing the transmission spectrum of an ideal multichannel filter for a chirped-pulse WDM system, in accordance with the present invention.
Figure 6A:
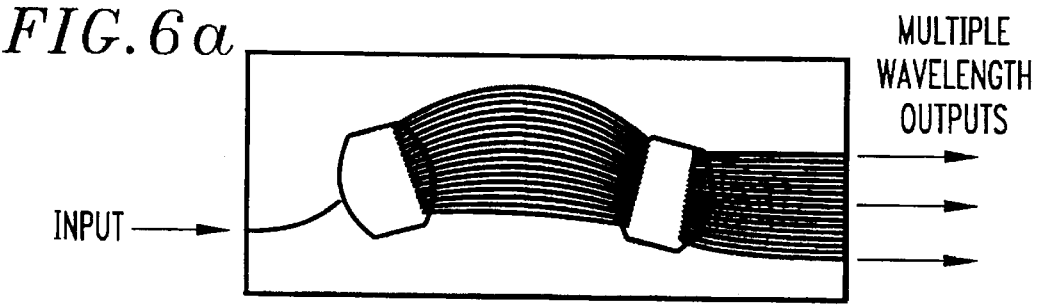
FIG. 6(a) a waveguide grating router that could be used in accordance with the present invention.
Figure 6B:
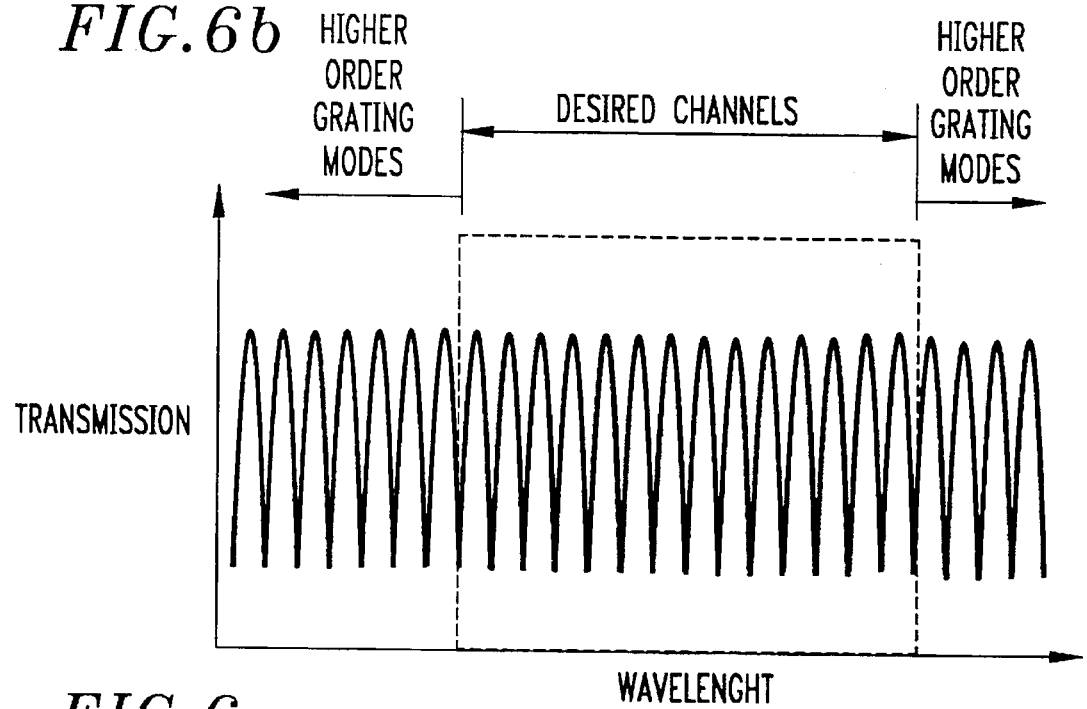
FIG. 6(b) is a diagram showing the transmission spectrum of a multiple wavelength filter such as a waveguide grating router that exhibits a periodic wavelength passband spectrum. Only the central channels are desired to be supported by the WDM system.
Figure 6C:
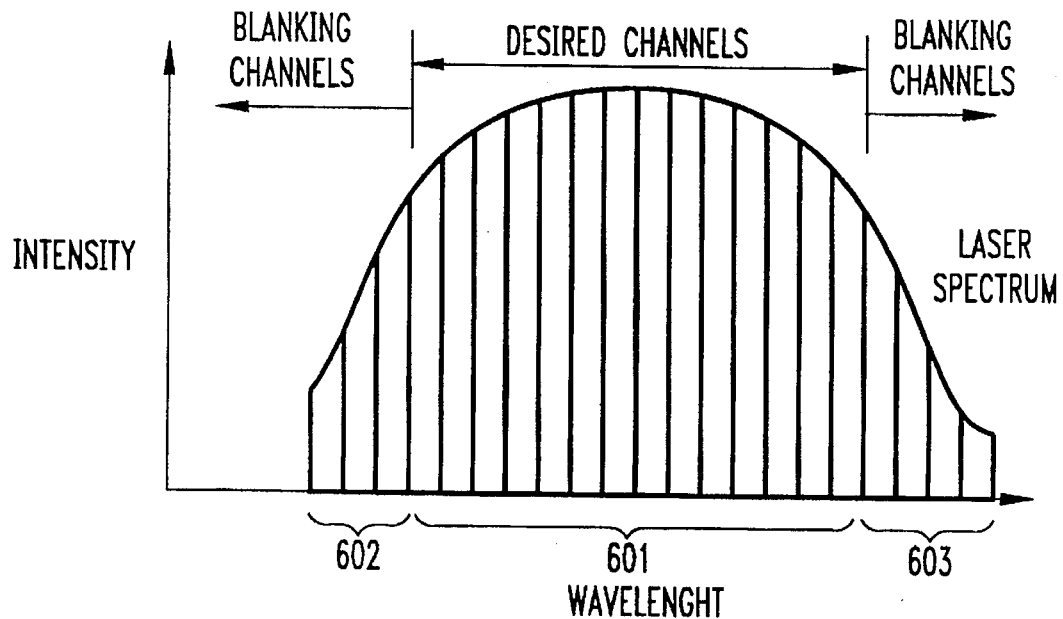
FIG. 6(c) is a diagram showing that source channels that fall outside of the region desired for spectral channels can be eliminated by TDM encoding zeros for the blanking channels.

FIG. 5 shows the transmission spectrum (wavelength comb) of an ideal multiple-channel filter device (e.g., waveguide grating router 211) which may be used at receiver 210. This device 211 selects and routes each successive wavelength channel to a separate optical fiber (209) with as little on-channel loss as possible and with as little crosstalk between channels as possible. FIG. 6(a) shows an integrated-optic WDM device conventionally used to implement such a waveguide grating router (WGR) 211. FIG. 6(b) shows the periodic passband transmission characteristic for such a device. Within the band center, there are a number of desired transmission channels. Outside of that region, the integrated-optic WGR components exhibit a periodic passband behavior. FIG. 6(c) shows a typical transmission intensity spectrum. Note the wavelength components that fall outside the desirable channel region 601 can be effectively 'blanked' by transmitting "0" date signals in the appropriate TDM time slots 602, 603. This improves overall system crosstalk/signal-to-noise ratio. When used in conjunction with the chirped-pulse transmitter 200 previously described, this WDM device 211 provides a passive WDM receiver 210 for the WDM transmission/receiving system of FIG. 1. Integrated optics versions of WDM device 211 have been made in silica-on-silicon substrates and with InGaAsP wafers including on-chip amplifiers. Bulk components, consisting of fiber arrays and gratings, or multiple interference filter components could also be used to provide a passive WDM receiver.

FIG. 7 shows that even WDM splitters that have unequal channel spacings 701 can be made to work with the present WDM transmitter by merely phase-shifting the TDM data stream.

Figure 8:
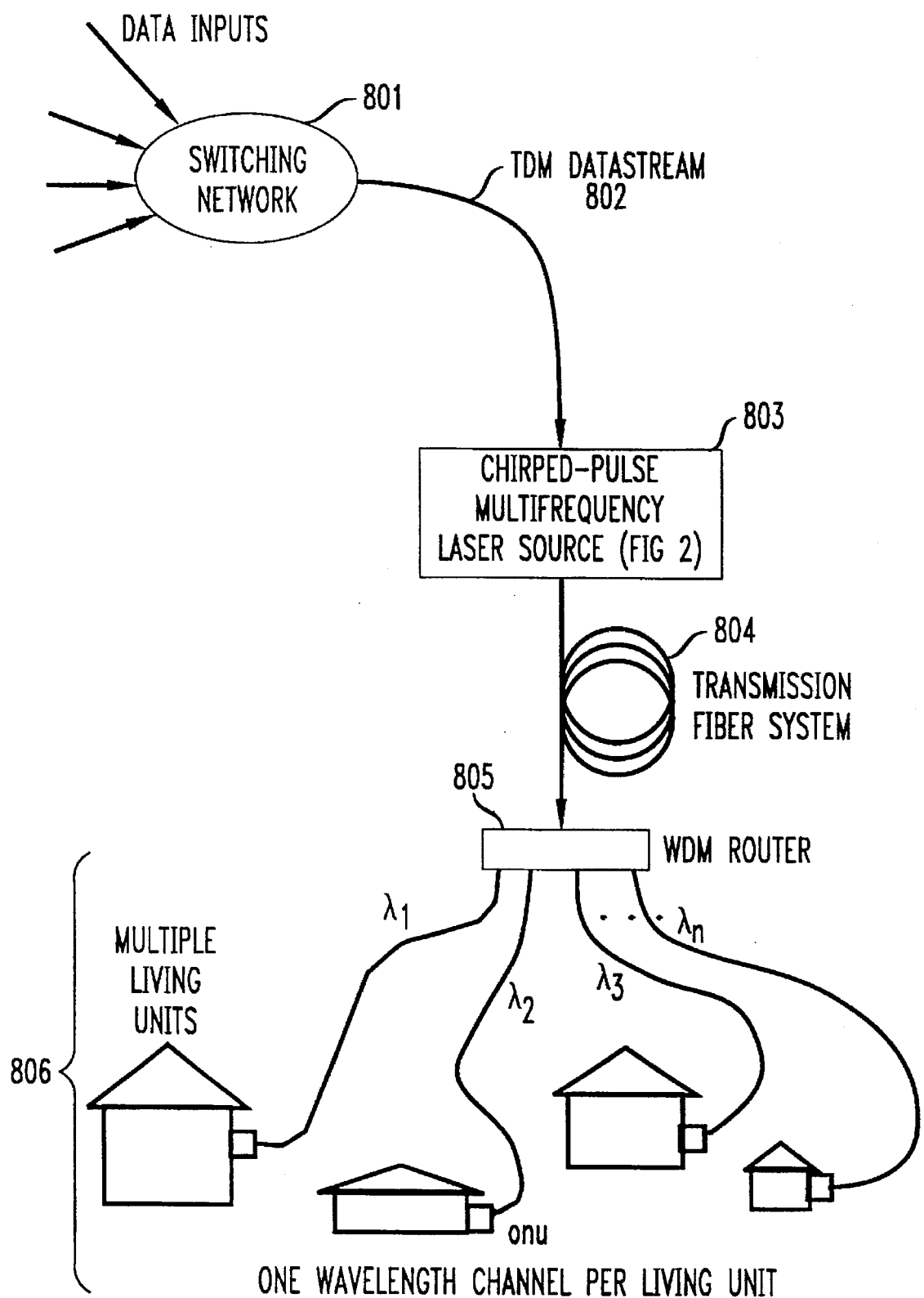
FIG. 8 is a block diagram of an exemplary optical network for WDM local access in accordance with the present invention.

FIG. 8 shows an exemplary network into which such a chirped-pulse WDM transmission system would be installed. Data enters a switching network 801 from a data source or from another network. The switching network 801 formats the multichannel data into a high-speed TDM stream to be used with the WDM transmitter. The chirped-pulse WDM transmitter 803 then encodes the high-speed TDM data stream onto the broadband modelocked laser output, and transmits the data through a transmission 804 (10–20 km) to the remote location where the WDM splitter device 805 is located. The individual wavelength channels are then separated at the WDM device 805, and each wavelength signal is directed to a separate ONU (optical network unit) 806 which receives the data with a low-rate inexpensive decoding receiver operating at 50 MHz.

Figure 9:
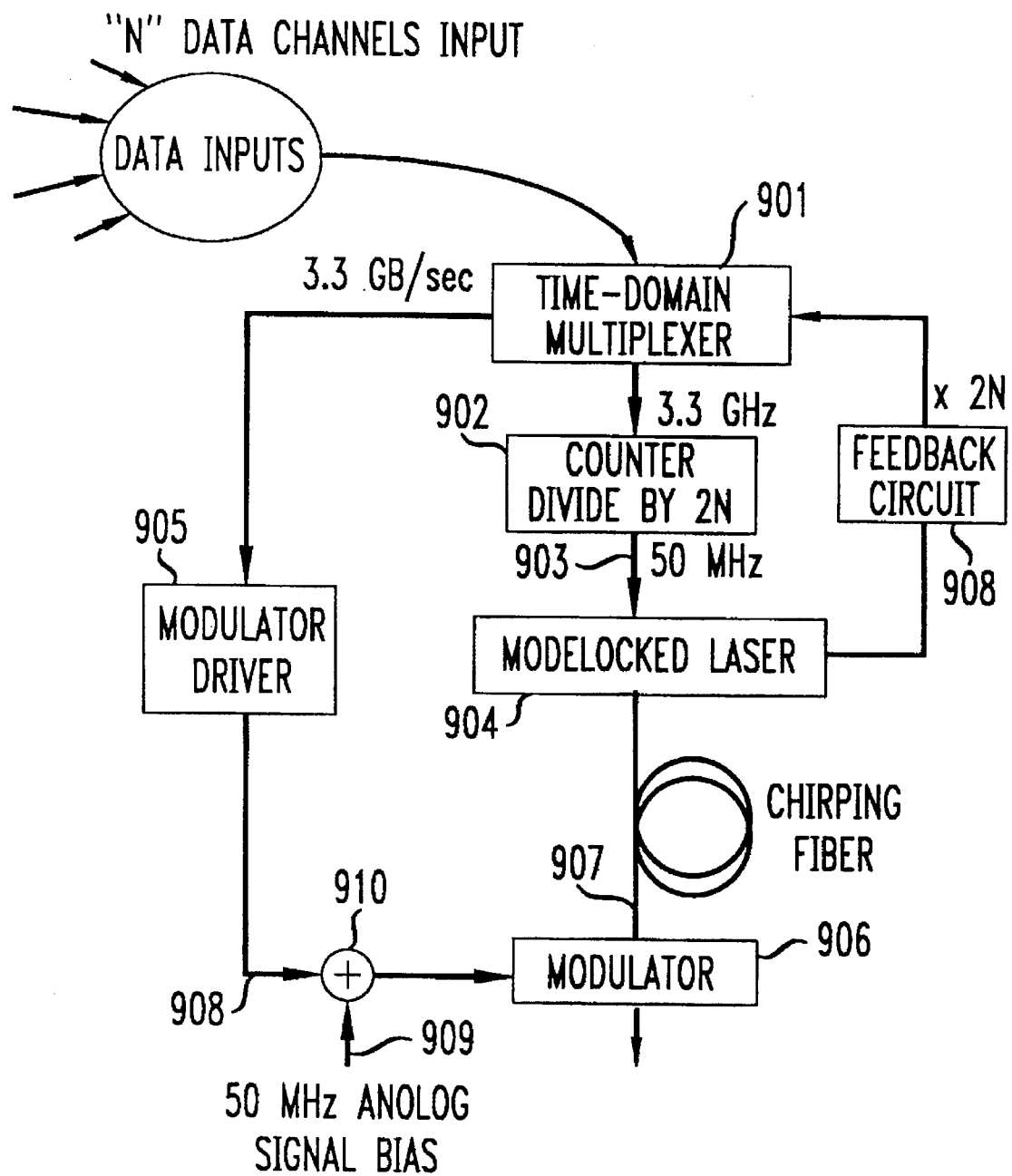
FIG. 9 is an exemplary diagram of showing the means for synchronizing the TDM data source with the modelocked laser, using a feedback loop from the modelocked laser.

FIG. 9 shows a WDM transmitter including an electronic synchronization control circuit that locks the modelocked laser repetition rate (50 MHz) to equal the downstream data rate. The TDM circuit 901 provides data to modulation driver 905 and modulator 906 to encode the chirped laser signal 907. The TDM circuit 901 also uses a counter 902 to generate a synchronization signal 903 at the downstream data rate (50 MHz) that is applied to the modelocked laser 904. The passively modelocked laser 904 can be externally synchronized to this external standard with the use of feedback circuit 908 using phase-locked loop servo devices and RF mixing techniques. The operation of adding 910 the analog signal bias 909 to the TDM modulating data 908 will be described in a later paragraph.

Figure 10:
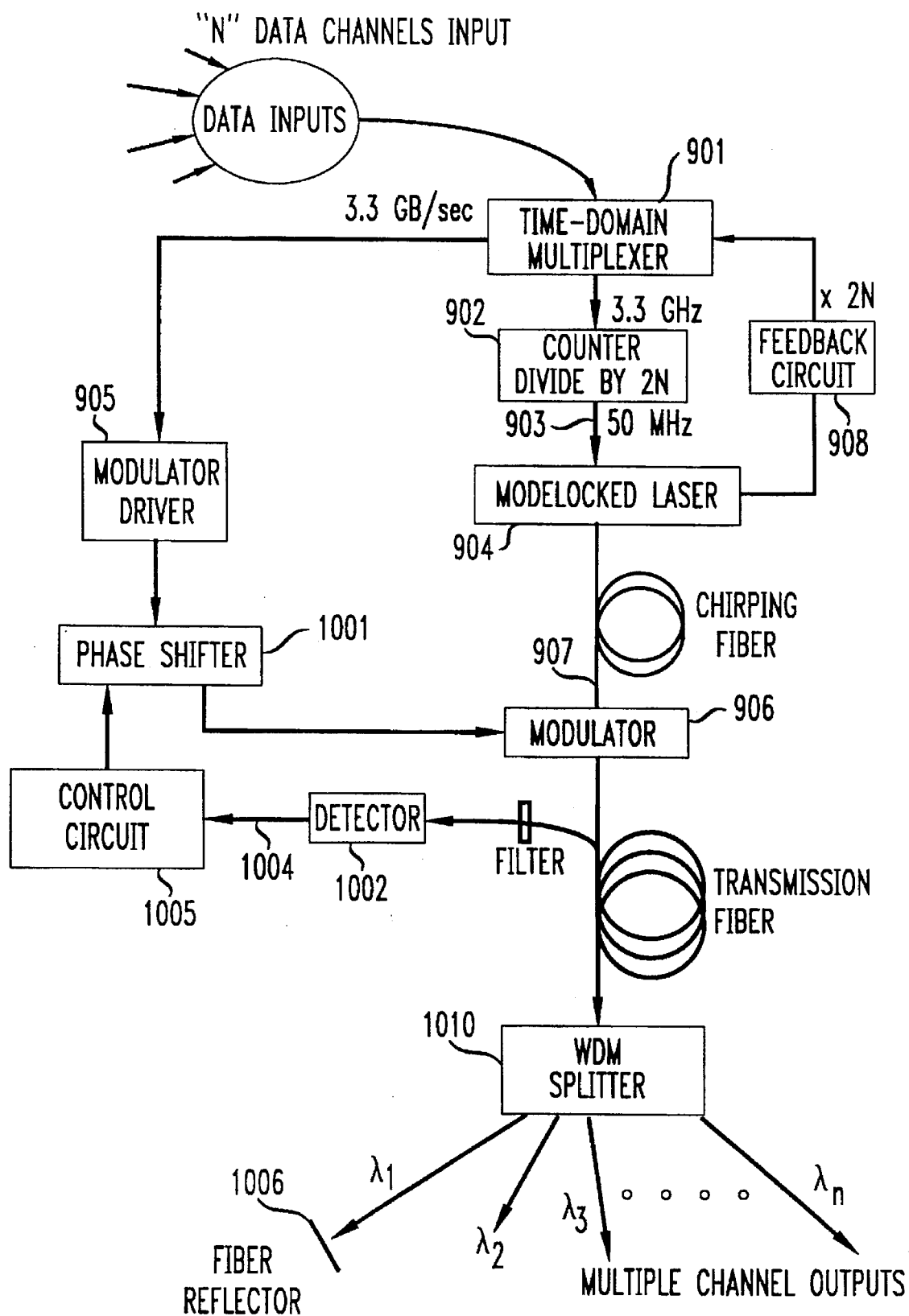
FIG. 10 is an exemplary diagram of a further locking scheme for implementing multichannel tuning via feedback from the wavelength router.

FIG. 10 shows the addition of a feedback technique to the WDM transmitter of FIG. 9 to ensure that the correct wavelengths are demultiplexed at the WDM splitter 1010 at the receiver location to compensate for temperature drift of the wavelength channels at the WDM transmitter. A phase shifter (variable time delay) 1001 is placed into the modulator driving line. One of the WDM channels (e.g., channel 1 of FIG. 1) is retroreflected by reflector 1006 after passing through the WDM splitter 1010, and the reflected signal is monitored with a detector 1002 that looks through a filter 1003 that passes only channel 1 wavelengths. This detector generates an error signal 1004 that is fed back to control circuit 1005 which generates a control signal to control phase shifter 1001. This loop then ensures that WDM splitter 1010 is always tuned to the WDM transmitter, even in the event of temperature variations.

Figure 11A:
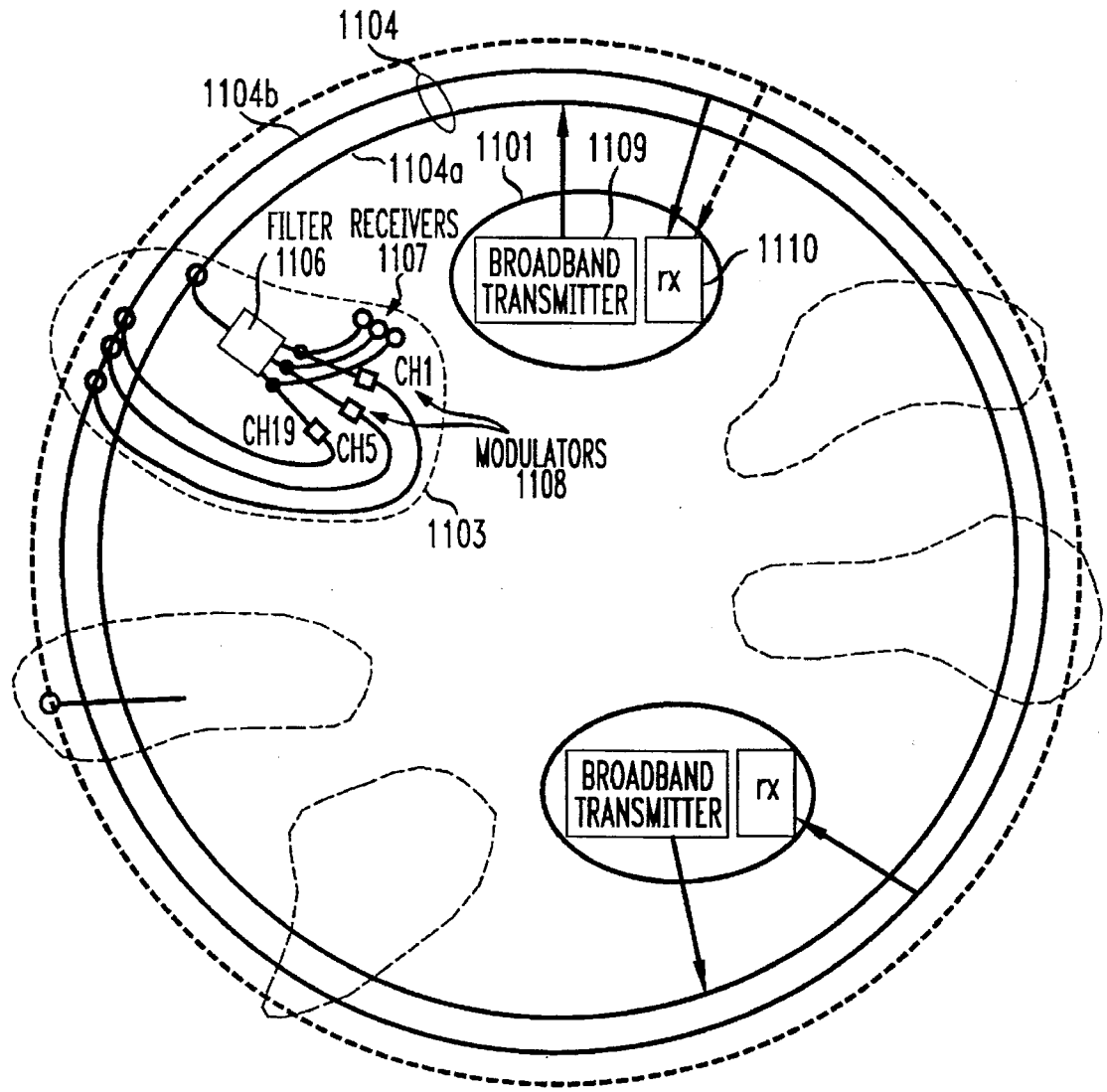
FIG. 11 is an exemplary diagram showing a ring network architecture in which multichannel WDM is used to transmit a large number of channels (16, 32, 64 or 128), and enabling loopback or two-way communications.
Figure 11B:
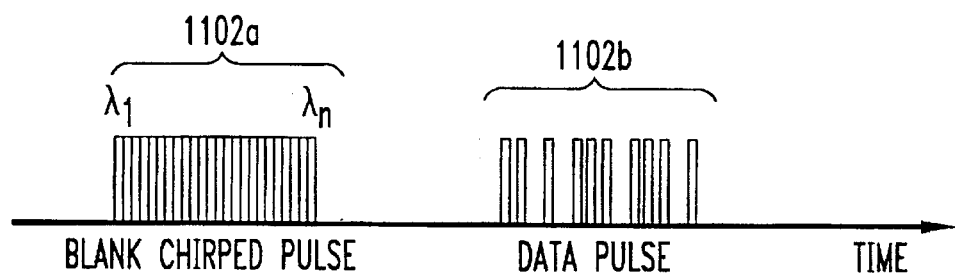
Figure 12A:
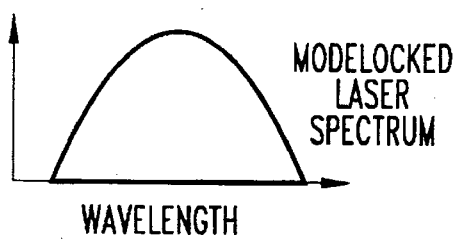
FIGS. 12(a) to 12(f) show illustrative waveforms depicting the use of an analog signal in addition to the digital data signal in order to equalize the wavelength spectrum from the modelocked optical source.
Figure 12B:
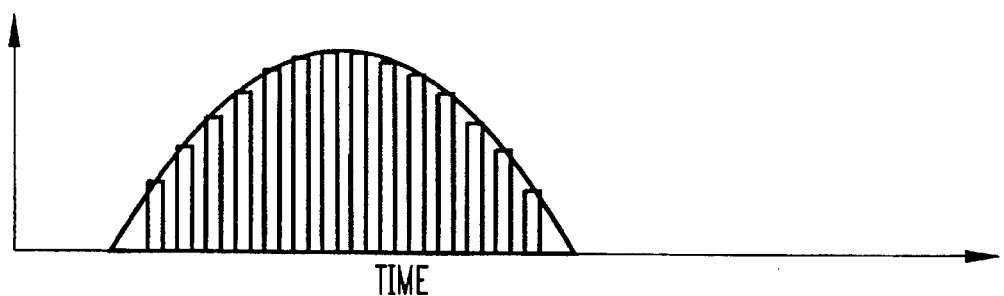
Figure 12C:
Figure 12D:
Figure 12E:
Figure 12F:

FIG. 11 shows a ring network architecture in which the ability to transmit and allocate a large number of spectral channels (32, 64 or 128) may prove advantageous. For instance, in undersea lightwave communication schemes, in increased granularity in system design is desirable. In this case, flexible bidirectional multichannel WDM schemes are required. Shown in FIG. 11 is a central location 1101 connected to a plurality of hub locations (e.g., 1103) over a bidirectional fiber facility 1104 (shown having separate fibers 1104a and 1104b for each direction). As shown in FIG. 11, a multiwavelength chirped-pulsed WDM transmitter 1105 in accordance with the present invention transmits at twice the desired downstream data rate, i.e., it transmits an unmodulated chirped pulse 1102b after each data modulated chirped pulse 1102a as shown in FIG. 11(b). At a number of hubs (e.g., 1103), the signals are tapped off with a passive wavelength-independent splitter, thus giving each hub access to all the wavelength channels. A filter (e.g., 1106) separates one or more of the desired wavelength channels (e.g., channels 1, 5, 19) for delivery of data to that particular hub. Individual receivers 1107 tap those signals and detect the downstream data. The remainder of the signals passes through a broadband optical modulator 1108 which absorbs the remainder of the downstream data, and transmits the upstream data (e.g., 1109) by encoding it onto the unmodulated chirped pulse 1102a. The modulated chirped pulse is then coupled into a separate fiber ring 1104b and transmitted back to the central location 1101 where a receiver 1110 detects the data. The benefits of this architecture are several: no multifrequency active (laser) devices are required in the hubs 1103; there is no need for waveguide grating routers in the hubs; and there is increased 'granularity' as a result of the increased number of wavelength channels made available by the single-source chirped pulse WDM transmitter 1105.

With joint reference to FIGS. 9 and 12, another aspect of the present invention makes it possible to electronically equalize the separate wavelength signals by using an analog electronic signal. Generally, modelocked lasers (e.g. 904) emit pulses with a spectral shape that can be approximated by a parabola (FIG. 12(a)). Once chirped, these pulses will have unequal wavelength amplitude distribution (FIG. 12(b)). After modulation with TDM digital data from lead 908, FIG. 12(c), an unequalized TDM encoded data signal, FIG. 12(d), results. This can be equalized by selecting different voltage pulses in the digital signals having the same approximate amplitude. This approach, however, may be difficult to implement with GB/sec electrical waveforms. FIG. 12(f) shows that by adding (using adder 910) to TDM digital data modulator signal on lead 908, FIG. 12(c), an analog signal on lead 909, FIG. 12(e), such as a sine wave at a frequency equal to the fundamental downstream rate (e.g., 50 MHz) with the correct phase, the broadband optical modulator 906 can be made to correct for the unequal laser spectrum, FIG. 12(a), to a first order. The resulting equalized data signal is shown by FIG. 12(f). The loss in amplitude can be made up by further amplifying. Going further, by adding successive RF harmonics to the analog signal, FIG. 12(e), of the correct amplitude and phase, an optical spectrum of arbitrary shape can be completely equalized. Further, RF phase modulation can be applied in a similar manner to equalize the frequency spaciangs of the wavelength channels.

With reference to FIG. 13, we describe a fiber grating ensemble for producing a series of chirped pulses without using the long dispersing fiber discussed previously and shown in 202 of FIG. 2.

Figure 13A:
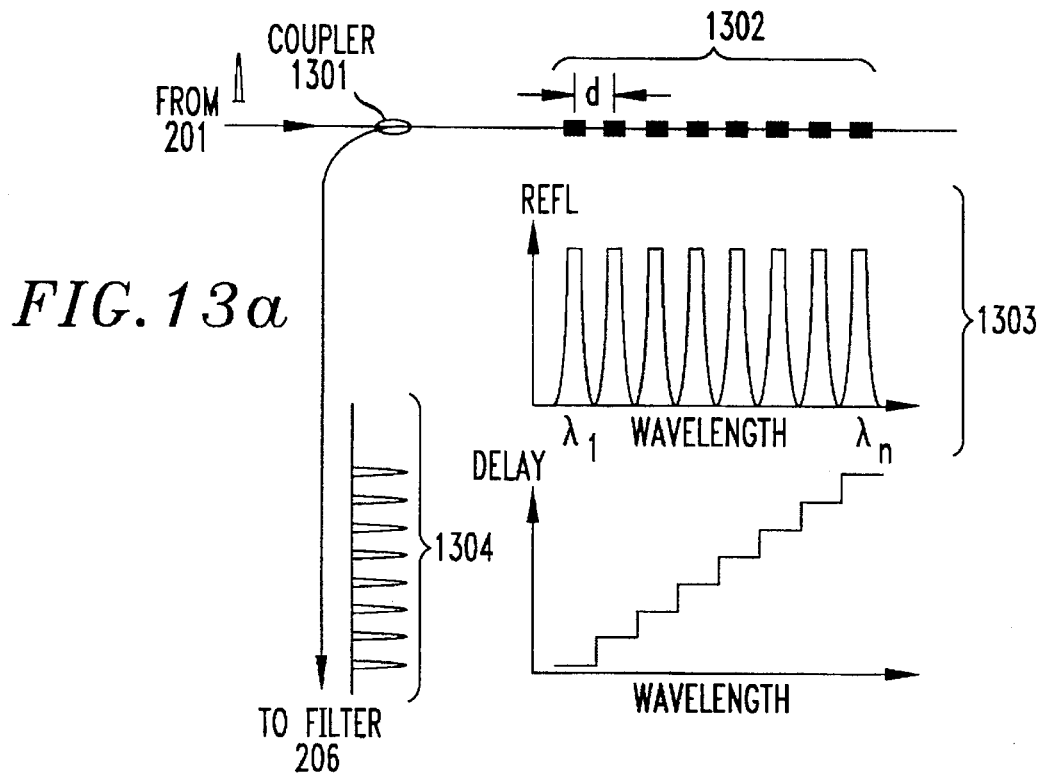
FIG. 13(a) illustrates a fiber grating ensemble for producing a chirped pulse train.
Figure 13B:
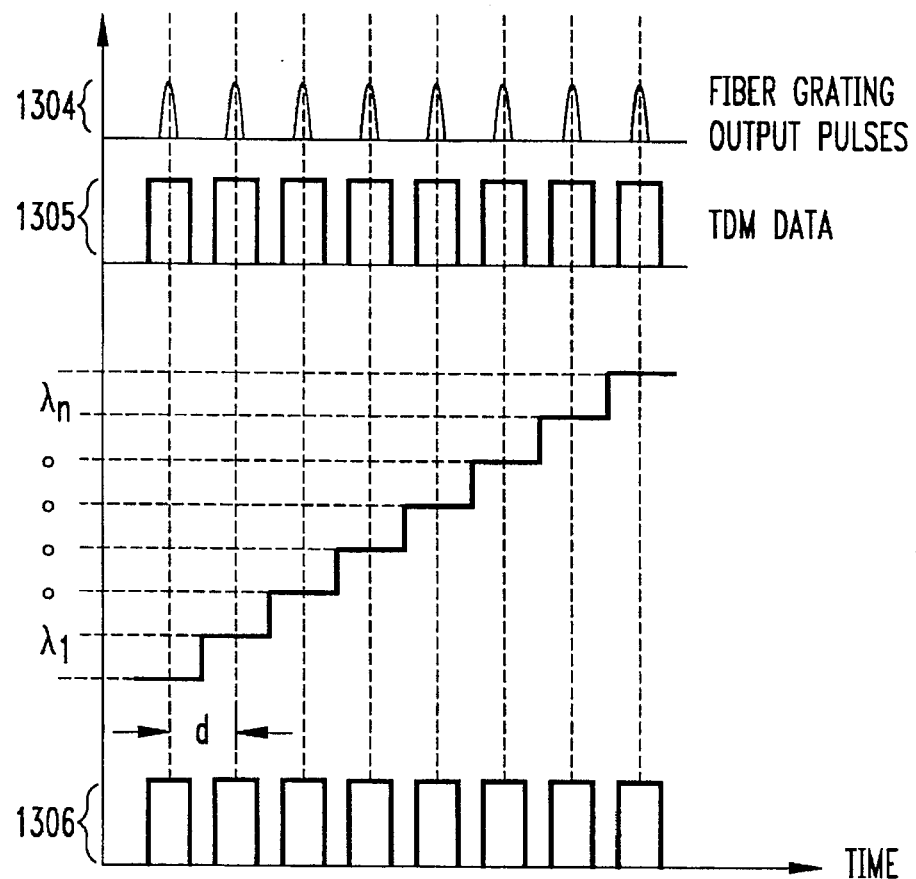
FIG. 13(b) illustrates the TDM encoding of the chirped pulse train.

FIG. 13(a) shows an alternative configuration for chirping the short optical pulse. The optical device shown in FIG. 13(a) replaces element 202 and connects between the laser source 201 and equalizing filter 206. A short pulse is transmitted through a 3 dB optical coupler 1301 and reflected off a series of fiber gratings 1302. As shown by the reflection characteristic 1303, each fiber grating reflects a narrow optical spectral band corresponding to an individual optical WDM channel. The fiber gratings 1302 are ordered in peak reflectivity from the lowest $\lambda_l$, to the highest $\lambda_n$ wavelength (or vice versa), and formed or written into an optical fiber at specific locations. They are physically spaced a distance, d, given by the speed of light, c, times the TDM time spacing divided by twice the effective index of refraction of the fiber. For example, a 2.5 Gb/sec TDM signal would require a physical spacing of 4 cm for a typical optical fiber. The pulse train 1304 reflected back from such a series of fiber gratings consists of a series of short optical pulses (~10 ps duration) at a series of increasing optical wavelengths. As shown in FIG. 13(b), the time spacing of the pulse train 1304 is equal to the TDM spacing 1305. FIG. 13(b) shows the relationship between each wavelength ($\lambda_l$–$\lambda_n$) and its optical pulse location in the pulse train 1304 that exits coupler 1301. This pulse train is then passed through the optical modulator 207 and encoded with the TDM data stream. This produces a series of optical pulses 1304 that are encoded with the data 1305, and these pulses are transmitted and split into separate wavelengths 1306 by WDM splitter 211 in a manner identical to the previous discussion.

FIG. 13(b) shows the time sequence of optical pulses that exits from the 3 dB coupler, superimposed with the TDM data stream. Further, FIG. 13(b) shows the manner in which the wavelengths of the individual pulses increase in time, in synchronization with the TDM bits. Small time shifts of the TDM data stream 1305 do not result in changes in the individual optical spectra for this embodiment.

There are several principal differences using this fiber gratings 1302 approach. First, such a fiber grating chirping device 1302 should be much more compact than a 16 km fiber spool, shown in 202; second, in principle it should cost less; and thirdly, it produces a rigorously fixed series of WDM channels that do not shift continuously with the TDM phase, as long as the phase shift remains within the TDM bit time spacing. Such a characteristic may desirable for certain applications in which rigorous timing precision is not possible.

We note that it would be possible to replace the series of fiber gratings 1302 with a single long chirped fiber grating. In such a case, the output of the 3 dB coupler would be a single long chirped optical pulse, and then the wavelength tuning discussed previously (in FIG. 4(b)) for the case of the chirping fiber is recovered.

Although the foregoing detailed description has described the present invention primarily in terms of particular applications of single-source WDM systems, it should be understood that the embodiments discussed are exemplary only. Many variations may be made in the arrangements shown, including the type of optical signal source, the type of pulse chirping medium, the type of optical modulator, the type of WDM splitter, and the type of network architecture for implementation of a chirped-pulse WDM system. These and other alternatives and variations will be readily apparent to those skilled in the art, and the present invention is therefore limited only by the appended claims.

We claim:

1. An optical multiple wavelength apparatus comprising
an optical disperser for receiving short optical pulses at a first rate and forming therefrom a train of chirped optical pulses with each such chirped optical pulse extending over a plurality of time periods, each time period associated with a different optical wavelength channel; and an optical modulator encoding an optical wavelength channel of one or more of the time periods of selected ones of the chirped optical pulse train using a data signal operating at a second rate equal to or greater than said first rate to form an encoded optical signal.

2. The optical multiple wavelength apparatus of claim 1 wherein the data signal is a time division multiplex (TDM) signal and the encoded optical signal is an encoded TDM optical signal.

3. The optical multiple wavelength apparatus of claim 1 wherein the second rate is equal to or greater than said first rate multiplied by the number of optical wavelength channels.

4. The optical multiple wavelength apparatus of claim 1 wherein the second rate is equal to or greater than said first rate multiplied by twice the number of optical wavelength channels.

5. The optical multiple wavelength apparatus of claim 1 wherein the short optical pulses have a pulse width that is less than or equal to the inverse of the second rate.

6. The optical multiple wavelength apparatus of claim 5 wherein the optical disperser is an optical prism.

7. The optical multiple wavelength apparatus of claim 1 wherein the optical disperser is a single-mode dispersive optical fiber.

8. The optical multiple wavelength apparatus of claim 1 wherein the optical disperser is an optical grating.

9. The optical multiple wavelength apparatus of claim 1 further including
a frequency-dependent filter connected to the output of the optical disperser for equalizing the power spectra of all optical wavelength channels.

10. The optical multiple wavelength apparatus of claim 9 wherein the frequency-dependent filter is a cladding-dumping fiber grating.

11. The optical multiple wavelength apparatus of claim 9 wherein the frequency-dependent filter is a multilayer interference filter.

12. The optical multiple wavelength apparatus of claim 1 wherein alternate chirped optical pulses are selected for encoding and the remaining chirped optical pulses are not encoded.

13. The optical multiple wavelength apparatus of claim 1 wherein each of the chirped optical pulses are selected for encoding.

14. The optical multiple wavelength apparatus of claim 1 wherein the plurality of time periods are divided into at least two portions, at least one portion having at least one optical wavelength channel encoded by the optical modulator and at least one portion having no optical wavelength channels that are encoded.

15. The optical multiple wavelength apparatus of claim 1 wherein the data signal is an analog signal.

16. The optical multiple wavelength apparatus of claim 1 wherein the optical modulator is responsive to an input analog signal having a predefined amplitude characteristic which is modulated by the optical modulator to produce a substantially amplitude-equalized encoded optical signal.

17. The optical multiple wavelength apparatus of claim 16 wherein the predefined amplitude characteistic also has a predefined phase characteristic.

18. The optical multiple wavelength apparatus of claim 16 wherein the predefined amplitude characteristic is a sinusoidal signal having the same frequency as said first rate.

19. An optical multiple wavelength communication system including the multiple wavelength apparatus of claim 1 arranged for transmitting the encoded optical signal over an optical medium and comprising a multiple wavelength receiver for demultiplexing the optical signal into the plurality of modulated optical wavelength channels.

20. The optical multiple wavelength communication system of claim 19 wherein the multiple wavelength receiver is a passive WDM router.

21. The optical multiple wavelength communication system of claim 19 wherein the multiple wavelength receiver is a waveguide grating router.

22. The optical multiple wavelength communication system of claim 19 wherein the multiple wavelength receiver is a diffraction grating.

23. The optical multiple wavelength communication system of claim 19 wherein the multiple wavelength receiver is an interference filter array.

24. The optical multiple wavelength communication system of claim 19 further including a phase detector circuit connected to the output of the optical modulator to detect the phase of signals in a modulated optical wavelength channel and in response thereto generating a control signal and a phase shifting circuit responsive to said control signal for controlling the alignment of optical wavelength channels with time periods of the data signal.

25. The optical multiple wavelength communication system of claim 19 wherein at said multiple wavelength apparatus, alternate chirped optical pulses are selected for encoding and are sent along with the unencoded chirped optical pulses over the optical medium, and said multiple wavelength receiver includes a selective demultiplexer for selecting one or more modulated optical wavelength channels to be decoded, and an optical modulator for modulating a data signal onto one or more optical wavelength channels of the unencoded chirped optical pulses for transmission to said multiple wavelength apparatus.

26. The optical multiple wavelength communication system of claim 25 wherein a first optical medium is used for transmission to said multiple wavelength receiver and a second optical medium is used for transmission to said multiple wavelength apparatus.

27. The optical multiple wavelength communication system of claim 25 wherein said multiple wavelength apparatus includes a receiver for selecting at least one of said one or more modulated optical wavelength channels transmitted from said multiple wavelength receiver to be decoded.

28. A method of operating an optical multiple wavelength communication system comprising the steps of:

receiving short optical pulses at a first rate and forming a train of chirped optical pulses having a plurality of time periods, each time period associated with a different optical wavelength channel;

encoding the optical wavelength channel of one or more of the time periods of selected ones of the chirped optical pulse train using a data signal operating at a second rate equal to or greater than said first rate;

transmitting the resulting encoded optical signal over an optical medium; and receiving over the optical medium and demultiplexing the encoded optical signal into a plurality of modulated optical wavelength channels.

29. A method of forming optical multiple wavelength signals comprising the steps of:

receiving short optical pulses at a first rate and forming therefrom a train of chirped optical pulses with each such chirped optical pulse extending over a plurality of time periods, each time period associated with a different optical wavelength channel; and encoding the optical wavelength channel of one or more of the time periods of selected ones of the chirped optical pulse train using a data signal operating at a second rate equal to or greater than said first rate to form an encoded optical signal.

* * * * *